United States Patent
Sakamoto et al.

[11] Patent Number: 6,037,375
[45] Date of Patent: Mar. 14, 2000

[54] NUTRIENT COMPOSITION

[75] Inventors: Shuichi Sakamoto; Hiroshi Okamatsu, both of Kurume; Koji Okamura, Kasuga; Akihisa Takaichi, Naruto; Toshihiko Okamoto, Tokushima; Tetsuo Fukuda, Naruto, all of Japan

[73] Assignee: Otsuka Pharmaceutical Co., Ltd., Tokyo, Japan

[21] Appl. No.: 08/878,063

[22] Filed: Jun. 18, 1997

Related U.S. Application Data

[63] Continuation of application No. 08/256,519, filed as application No. PCT/JP93/01624, Nov. 8, 1993, abandoned.

[30] Foreign Application Priority Data

Nov. 10, 1992 [JP] Japan ..................... 4-300075
Mar. 24, 1993 [JP] Japan ..................... 5-065189

[51] Int. Cl.⁷ .................................. A01N 37/12
[52] U.S. Cl. .......................... 514/561; 514/565
[58] Field of Search ..................... 174/561, 565

[56] References Cited

U.S. PATENT DOCUMENTS 5,132,113  7/1992  Lucá .

FOREIGN PATENT DOCUMENTS

| 0087068 | 8/1983 | European Pat. Off. . |
|---|---|---|
| 0259167 | 3/1988 | European Pat. Off. . |
| 0482715 | 4/1992 | European Pat. Off. . |
| 0511587 | 11/1992 | European Pat. Off. . |
| 60-78560 | 5/1985 | Japan . |
| 60-94075 | 5/1985 | Japan . |
| 59-210871 | 1/1986 | Japan . |
| 4126057 | 4/1992 | Japan . |
| 4346770 | 12/1992 | Japan . |

OTHER PUBLICATIONS

CA 106:83326 1986.

*Primary Examiner*—Paul J. Killos
*Attorney, Agent, or Firm*—Sughrue, Mion, Zinn Macpeak & Seas, PLLC

[57] ABSTRACT

The invention presents a nutrient composition comprising insulin secretion promoting amino acid and food material having antioxidation action as essential ingredients.

The composition of the invention is useful for feeding at the time of physical exhaustion or fatigue due to exercise, suppression of formation of radicals by promotion of respiration during exercise, and supplementing vitamins.

1 Claim, No Drawings

NUTRIENT COMPOSITION

This is a Continuation of application Ser. No. 08/256,519 filed Jul. 11, 1994 now abandoned; PCT/JP93/01624 filed Nov. 8, 1993.

TECHNICAL FIELD

The present invention relates to a nutrient composition, and more particularly to a nutrient composition useful for feeding in the state of physical exhaustion or fatigue due to exercise or the like, suppressing formation of radicals due to promotion of respiration under exercise, and feeding vitamins.

BACKGROUND ART

Today, in order to avoid adult diseases, and wishing healthy life, there are increasing occasions of enjoying sports such as golf, fitness exercises, athletics, and tennis, but foods sufficiently considering the health during and after exercise have been hardly developed yet.

That is, hitherto, as the beverages and foods for nutritional supplement at the time of exercise or fatigue, drinks for supplementing water, electrolytes and carbohydrates, and total nutrients or beverages blending all nutritional elements in good balance have been known and sold on market, but they do not sufficiently cope with the physical changes in special state such as physical exhaustion and fatigue due to exercise, and it has been demanded to develop alimentary foods capable of bringing about excellent feeding effects, sufficiently coping with such physical changes.

Man reserves carbohydrates in the liver and muscles as glycogen, and the reserve amount is required, as heat, about 1000 to 2000 kcal/body, which is not enough for long-term exercise or exercise in hunger. In such exercise, instead of carbohydrates, mainly lipid is consumed as energy source, but at this time when carbohydrates such as glucose are taken, the lipid metabolism is blocked, and the carbohydrates reserved as glycogen are consumed, thereby accelerating the drought of glycogen. When glycogen is used up, exercise cannot be maintained.

On the other hand, in tough energy-consuming sports such as marathon and boxing, it is required to keep the stamina for a long term and recover the lowered stamina quickly, and keeping and recovering of stamina are correlated with the amount of glycogen reserved in the body [Bergstram, J. et al. Acta Physiol. Scand., 71, 140 (1967)].

In such exercise, it is desired to reserve sufficient carbohydrates in a form of glycogen as far as possible, but with the conventional nutrient drinks or foods, no matter how much is taken, only the reserved glycogen as carbohydrates is consumed quickly by priority, and enough feeding and stamina recovery effects are not expected.

In addition, as the life becomes affluent, recently, the people's interest about health is increasing, and the concern about obesity is particularly high. To fight obesity, suppression of total calorie uptake, or so-called diet therapy is known, but this method is not considered very favorable nowadays, and it is considered preferable to lose weight by increasing calorie consumption by moderate sports. For example, aerobic exercises are very popular among young people. By taking drinks with high contents of carbohydrates during or after such sports, the once promoted carbohydrate metabolism is suppressed, and finally the effect of losing weight is hardly obtained.

Furthermore, when exercising outdoors, people are often exposed to ultraviolet rays, and radicals are produced in the body, or the respiration activity is promoted to form high oxygen concentrations in some parts of the body, and this high oxygen concentration produces active oxygen, and radicals may be formed in the body. In such circumstances, unless the radical chain reaction is stopped in the body, fatigue substances are accumulated, which may lead to physical exhaustion, lowering of performance, and further catabolism of bodily protein, morbid state, or even carcinogenesis in worst case.

It is hence a primary object of the invention to present a novel nutrient composition particularly suited for feeding during exercise.

It is other object of the invention to present a nutrient composition capable of suppressing consumption of glycogen in the body, promoting metabolism of carbohydrates, keeping stamina during exercise, and recovering from fatigue quickly after exercise.

It is a further object of the invention to present a nutrient composition capable of preventing formation of radicals in the body to avoid falling in morbid state.

DISCLOSURE OF THE INVENTION

The present inventor, after accumulating intensive studies, discovered for the first time that the nutrient composition containing insulin secretion promoting amino acid and food material having antioxidation action as essential ingredients conforms to the objects, and concluded the invention.

That is, the invention relates to a nutrient composition containing insulin secretion promoting amino acid and food material having antioxidation action as essential ingredients.

The invention specifically provides the composition in beverage form containing 5 to 1000 mg/100 ml insulin secretion promoting amino acid and 10 μg to 2000 mg/100 ml of food material having antioxidation action, the composition further containing 1 to 15 g/100 ml of carbohydrates and 0.1 to 30 mg/100 ml of carotenoids, the composition in tablet or powder form containing 5 to 1000 mg of insulin secretion promoting amino acid and 10 μg to 2000 mg of food material having antioxidation action, the composition containing 50 to 1000 mg/100 ml of arginine, 1 to 15 g/100 ml of fructose, and 100 to 1500 mg/100 ml of citric acid, the composition containing 0.1 to 30 mg/100 ml of carotene, 50 to 1000 mg/100 ml of arginine, 3 to 10 g/100 ml of fructose, 250 to 800 mg/100 ml of citric acid, 0 to 1000 mg/100 ml of vitamin C, and 0 to 100 mg/100 ml of vitamin E, and the composition in effervescent form.

BEST MODE FOR CARRYING OUT THE INVENTION

The food materials having antioxidation action used in the nutrient composition of the invention include, for example, carotenoids, vitamin E, vitamin C, glutathione, and selenium. In the invention, hereinafter, they are collectively called as antioxidant vitamins.

As the carotenoids, various materials hitherto known in the food and pharmaceutical fields may be used, including refined materials from natural substances (palm carotene, dunaliella carotene, etc.) and synthetic materials. Moreover, α-carotene, β-carotene, γ-carotene, lycopene, lutein, canthaxanthin, and others may be used either alone or in mixture in a form of animal or vegetable powder or extract. In particular, β-carotene is preferred above all.

As vitamin E and vitamin C, various materials hitherto known in the food and pharmaceutical fields may be used in the invention.

Such antioxidant vitamins can be blended in a proper content, either alone or in mixture of two or more kinds, in the composition of the invention depending on the form of the composition of the invention. For example, when preparing the composition of the invention in beverage form, the carotenoids may be added in a range of 0 to 30 mg, or preferably 0.5 to 10 mg, per 100 ml of beverage. Vitamin C can be blended at 0 to 1000 mg/100 ml, preferably 50 to 700 mg/100 ml, and vitamin E at 0 to 1000 mg/100 ml, preferably 1 to 100 mg/100 ml. Selenium can be added at 0 to 100 $\mu$g/100 ml, preferably 10 to 20 $\mu$g/100 ml, and glutathion by 1 to 500 mg/100 ml, preferably 30 to 300 mg/100 ml.

When added in the specified ranges, these antioxidant vitamins are taken up and act to stop radical reaction. Above all, the carotenoid is a precursor of vitamin A, and acts as provitamin A, and also has a potent action to stop radical chain reaction (radical scavenger action) because many conjugate double bonds are present in the chemical structure of carotenoid, and hence brings about the fatigue substance accumulation preventive action and even carcinogenesis preventive action.

Besides, since the carotenoid and vitamin E are oil-soluble, the composition of the invention prepared by blending them requires an oil (edible oil material) for dissolving the carotenoid and vitamin E and an emulsifier for emulsifying it. Such oil and emulsifier are not particularly limited, and any material hitherto used in the food and drink fields may be applied. Practical examples of the emulsifier include polyglycerin fatty acid esters, glycerin fatty acid esters, propylene glycol fatty acid esters, sucrose fatty acid esters, and soybean phospholipids.

In the composition of the invention, examples of insulin secretion promoting amino acids to be used together with the antioxidant vitamins include arginine, lysine, leucine, and phenylalanine. These amino acids are usually used in a free form, but not limited to this form, they may be similarly used in metalic salt form such as sodium and calcium, in inorganic or organic acid salt form such as sulfuric acid, hydrochloric acid, acetic acid, and malic acid, in N-acyl derivative form, or in peptide form by ester bonding of two or more amino acids. Particularly preferred amino acids are arginine and lysine.

These insulin secretion promoting amino acids may be also blended appropriately in the composition of the invention depending on the form of the composition of the invention. For example, to prepare the composition of the invention in a beverage form, they may be added in a range of 5 to 1000 mg, preferably 50 to 1000 mg, in 100 ml of the beverage.

When blended in such range, these insulin secretion promoting amino acids promote glycogen synthesis from carbohydrates, promote the lipid metabolism, suppress glycogen consumption, and act to keep the stamina during exercise and recover from fatigue early after exercise.

The nutrient composition of the invention contains the antioxidant vitamin and insulin secretion promoting amino acid as essential ingredients, and is prepared in the same manner as the ordinary food and beverage, and other food materials may be appropriately added. As particularly preferred food materials, sweeteners such as organic acids and carbohydrates may be used.

Organic acid components include citric acid, tartaric acid, malic acid, and succinic acid, and citric acid is particularly preferable. These organic acids are added usually in a range of 100 to 1500 mg/100 ml, preferably 250 to 800 mg/100 ml, and the composition of the material in beverage form can be prepared.

Examples of carbohydrates include monosaccharides such as glucose and fructose, disaccharides such as maltose sucrose, other ordinary sugars, sugar alcohols such as xylitol, sorbitol, glycerin and erythritol, polysaccharides such as dextrin and cyclodextrin, and oligosaccharides such as fructo-oligosaccharide, galacto-oligosaccharide and lacto-sucrose.

Of the carbohydrates, as the components not adversely affecting the lipid metabolism, fructose and glycerin are preferred. As oligosaccharide, addition of lacto-sucrose is preferred. The beverage composition of the invention can increase bifidobacteria in the body or lower the putrefaction products depending on the blend of the lacto-sucrose, so that the anticarcinogenic and immune system can be intensified further. Other sweeteners include natural sweeteners [thaumatin, stevia extract (rebaudioside A, etc.), glycyl-rhizinic acid, etc.), and synthetic sweeteners (saccharin, aspartame, etc.). These carbohydrates may be also added as carbohydrate mixture such as isomerized sugar and refined sugar.

The blending of the carbohydrates may be about 1 to 15 g in 100 ml of the beverage composition of the invention, preferably about 3 to 12 g. The content of the oligosaccharide is about 0.5 to 10 g, preferably 1 to 3 g.

The composition of the invention may also comprise, aside from the above, various nutrients, vitamins, minerals (electrolytes) including trace elements, perfumes including synthetic perfumes and natural perfumes, coloring matter, flavors (cheese, chocolate, etc.), pectic acid and its salts, alginic acid and its salts, organic acids, thickener as protective colloidal substance, pH regulator, stabilizer, preservative, glycerins, alcohols, and sparkling component for carbonated beverages. In addition, the composition of the invention may also contain natural juice or fruit to be presented as fruit drink or vegetable drink. These may be used either alone or in combination of two or more kinds. The blending rate of these additives is not particularly limited, and is generally selected in a range of about 0 to 20 parts by weight to 100 part by weight of the composition of the invention.

Vitamins include, whether water-soluble or fat-soluble, thiamine, niacin, retinol palmitate, bisbentiamine, riboflavin, pyridoxine hydrochloride, cyanocobalamin, sodium ascorbate, cholecalciferol, nicotinic acid amide, calcium pantothenate, folic acid, biotin, and choline ditartate, and in particular, those belonging to vitamin B group contributing to metabolism promotion are particularly preferable.

Trace elements of electrolytes (minerals) are ordinary compounds, for example, sodium hydrochloride, sodium acetate, magnesium sulfate, magnesium chloride, calcium chloride, dipotassium phosphate, monosodium phosphate, calcium glycerophosphate, sodium succinic citric acid iron, manganese sulfate, copper sulfate, zinc sulfate, sodium iodide, potassium sorbate, zinc, manganese, copper, iodine, and cobalt. The blending rate of these compounds may be properly determined as required.

The composition of the invention is prepared by blending these components, and the method of preparation is not particularly limited, and all components may be blended simultaneously, but more preferably carotenoid and/or vitamin E as antioxidant vitamin is preliminarily dissolved in oil, and an aqueous solution of insulin secretion promoting amino acid and other additives is emulsified by using an emulsifier, so that the composition of the invention may be prepared. More preferably, carotenoid and/or vitamin E oil solution or crystal is added to water and a proper emulsifier to emulsify, and an aqueous solution of insulin secretion promoting amino acid and other components is added and blended to the obtained emulsion. The blending operation of the components may be executed under ordinary temperature, or preferably executed by slight heating operation.

The emulsification can be executed by using a proper emulsifying machine, for example, homo-mixer or high pressure homogenizer, either by complete passing system or by circulation system. The emulsion after emulsification is filtered by conventional process, and poured into proper containers and sterilized, so that a desired beverage product is obtained. Sterilization may be effected by heating, aseptic filtering, etc.

To prepare the composition of the invention as carbonated beverage, carbon dioxide may be injected into the emulsifier by conventional process. Such beverage is preferred to be prepared in the osmotic pressure range of about 260 to 600 mOsm/kg.

The composition of the invention may be also prepared in an effervescent form. The effervescent form should contain, aside from the antioxidant vitamin and insulin secretion promoting amino acid as essential ingredients of the nutrient composition of the invention, proper amounts of sodium carbonate and/or sodium hydrogen carbonate and neutralizing agent as foaming components. The neutralizing agent used herein is an acidic compound capable of generating carbon dioxide by neutralizing sodium carbonate or sodium hydrogen carbonate. Such compound includes, for example, L-tartaric acid, citric acid, fumaric acid, ascorbic acid and other organic acid. Above all, ascorbic acid possesses both the action of neutralizing agent and the action of antioxidant.

The effervescent form of the invention may comprise, aside from those specified above, other various additives, such as vehicle, binder, disintegrating agent, lubricant, thickener, surfactant, osmotic pressure regulator, electrolyte, sweetener, perfume, pigment, pH regulator and others appropriately as required. Specifically, the additives include starches such as wheat starch, potato starch, corn starch, and dextrin, sugars such as sucrose, glucose, fructose, maltose, xylose, and lactose, sugar alcohols such as sorbitol, mannitol, maltitol, and xylitol, isotransposable glycosides such as coupling sugar and paratinose, vehicles such as calcium phosphate and calcium sulfate, binders and thickeners such as starch, sugar, gelatin, gum arabic, dextrin, methyl cellulose, polyvinyl pyrrolidone, polyvinyl alcohol, hydroxy propyl cellulose, xanthan gum, pectin, tragacanth gum, casein, and alginic acid, lubricants such as leucine, isoleucine, valine, sugar-ester, hardening oil, stearic acid, magnesium stearate, talc, and macrogol, disintegrating agents such as avicel, CMC, CMC-Na and CMC-Ca, surfactants such as polysorbate and lecithin, and sweeteners such as sugars, sugar alcohols, aspartame, alitame, other dipeptides, stevia, and saccharin, and they may be used in proper amounts selectively in consideration of the relation with the essential components, property of the composition, manufacturing method, etc. Besides, various vitamins may be added to the effervescent form.

The manufacturing method in the invention is basically same as in the manufacturing method of the usual effervescent preparations such as effervescent tablets. That is, components are weighed, mixed, and prepared directly by the powder compression method, dry or wet granular compression method, etc.

Thus obtained form of the invention (effervescent tablet) is put in water to become a beverage form suitable for oral administration, and is administered orally.

The dose is properly determined depending on the age, sex, body weight, degree of disease and other condition of each person, and is not particularly limited, but generally one or two tablets prepared to contain about 1.5 to 6.0 g each may be dissolved in 100 to 300 ml of water to be taken orally.

The preparation of the invention is not limited to the effervescent form, but may be prepared in various forms as far as conforming to the specified composition, in a proper form to be taken by dissolving and dispersing in water, such as granules, powder and capsules.

As the form of food, it may be prepared in a variety, including caramel, drop, chocolate, jelly, candy, biscuit, and cookie. To prepare in these forms, according to the conventional method, necessary additives together with essential ingredients are shaped into a proper form by using or without using proper carrier. As the carrier, for example, flour, rice powder, starch, corn starch, soybean, etc. can be used.

The beverage or food of the invention in various forms prepared as described herein is properly sterilized according to the conventional method, and is presented as a product.

Industrial Applicability

The nutrient composition of the invention is taken at the time of physical exhaustion or fatigue during or after exercise or on other occasions, and brings about effects of nutritional supply, recovery from fatigue and recovery of stamina. In particular, the nutrient drink or food of the invention possesses stamina keeping action during exercise, glycogen-producing action in muscles and liver, antioxidation action, radical scavenger action, vitamin supplementing action, lipid metabolism promoting action without adverse effects on lipid metabolism if taken during exercise, obesity preventive action, and fatigue recovery action, and is very useful as a novel nutrient composition.

EXAMPLES

Examples are described below in order to more specifically describe the invention. In the following examples, parts and % refer to parts by weight and wt. %, unless otherwise noted.

Examples 1 to 16

Antioxidant vitamins (β-carotene, lycopene, lutein, ascorbic acid, or vitamin E), insulin secretion promoting amino acid (arginine or lysine), emulsifying agent (sucrose fatty acid ester), oil (refined citrus oil), carbohydrates (fructose-glucose, sucrose, or fructose), organic acid (citric acid or tartaric acid), oligosaccharide (fructo-oligosaccharide, lacto-sucrose), perfume, sweetener, and carbon dioxide were blended as specified in Table 1 and Table 2, and the compositions of the invention in beverage form were prepared.

TABLE 1

| Ingredients (in 100 ml) | | Example No. | | | | | | | |
|---|---|---|---|---|---|---|---|---|---|
| | | 1 | 2 | 3 | 4 | 5 | 6 | 7 | 8 |
| Antioxidant vitamins | | | | | | | | | |
| β-Carotene | (mg) | 1 | — | 3 | 5 | 30 | 0.3 | 1 | 1 |
| Extracted carotene | (mg) | — | 1 | — | — | — | — | — | — |
| Ascorbic acid | (mg) | 60 | 50 | 120 | 1000 | 100 | 20 | 60 | 30 |
| Vitamine E | (mg) | — | — | 2 | 5 | — | — | — | 2 |
| Arginine | (mg) | 300 | 300 | 600 | 1000 | 500 | 100 | 300 | 300 |
| Emulsifier | (mg) | proper | proper | proper | proper | proper | proper | proper | proper |
| Oil | (mg) | proper | proper | proper | proper | proper | proper | proper | proper |
| Carbohydrates | | | | | | | | | |
| Isomerized sugar | (g) | — | — | — | 2 | — | — | — | — |
| Refined sugar | (g) | — | — | — | 1 | — | — | — | 2 |
| Fructose | (g) | 7 | — | 7 | 4 | 5 | 2 | 8 | 8 |
| Glucose | (g) | — | 8 | 2 | — | 2 | — | 1 | — |
| Organic acids | | | | | | | | | |
| Citric acid | (mg) | 500 | 600 | 600 | 200 | 500 | 200 | 400 | 400 |
| Tartaric acid | (mg) | — | — | 200 | — | 100 | — | — | — |
| Malic acid | (mg) | — | — | — | — | 100 | — | — | 100 |
| Fructo-Oligosaccharide | (g) | — | — | — | — | — | 3 | — | 1 |
| Carbon dioxide volume | (Vol) | — | — | — | — | — | — | 1 | 2 |
| Perfume, sweetener | | proper | proper | proper | proper | proper | proper | proper | proper |

TABLE 2

| Ingredients (in 100 ml) | | Example No. | | | | | | | |
|---|---|---|---|---|---|---|---|---|---|
| | | 9 | 10 | 11 | 12 | 13 | 14 | 15 | 16 |
| Antioxidant vitamins | | | | | | | | | |
| Lycopene | (mg) | 1 | — | 3 | 5 | 30 | 0.3 | 1 | 1 |
| Lutein | (mg) | — | 1 | — | — | — | — | — | — |
| Ascorbic acid | (mg) | 60 | 50 | 120 | 1000 | 100 | 20 | 60 | 30 |
| Vitamine E | (mg) | — | — | 2 | 5 | — | — | — | 2 |
| Lysine | (mg) | 300 | 300 | 600 | 1000 | 500 | 100 | 300 | 300 |
| Emulsifier | (mg) | proper | proper | proper | proper | proper | proper | proper | proper |
| Oil | (mg) | proper | proper | proper | proper | proper | proper | proper | proper |
| Carbohydrates | | | | | | | | | |
| Isomerized sugar | (g) | — | — | — | 2 | — | — | — | — |
| Refined sugar | (g) | — | — | — | 1 | — | — | — | 2 |
| Fructose | (g) | 7 | — | 7 | 4 | 5 | 2 | 8 | 8 |
| Glucose | (g) | — | 8 | 2 | — | 2 | — | 1 | — |
| Organic acids | | | | | | | | | |
| Citric acid | (mg) | 500 | 600 | 600 | 200 | 500 | 200 | 400 | 400 |
| Tartaric acid | (mg) | — | — | 200 | — | 100 | — | — | — |
| Malic acid | (mg) | — | — | — | — | 100 | — | — | 100 |
| Lacto-sucrose | (g) | — | — | — | — | — | 3 | — | 1 |
| Carbon dioxide volume | (Vol) | — | — | — | — | — | — | 1 | 2 |
| Perfume, sweetener | | proper | proper | proper | proper | proper | proper | proper | proper |

We claim:

1. A method for suppressing radical formation, comprising feeding a subject a beverage comprising 5 to 100 mg/100 ml of at least one insulin secretion promoting amino acid selected from the group consisting of arginine, lysine and leucine, and 10 μg to 2000 mg/100 ml of at least one food material having anti-oxidation action selected from the group consisting of carotenoid, α-carotene, β-carotene, γ-carotene, lycopene, lutein, canthaxanthin, glutathione and selenium.

* * * * *